United States Patent [19]

Lofquist et al.

[11] 4,083,893

[45] Apr. 11, 1978

[54] OZONE RESISTANT, CATIONIC DYEABLE NYLON CONTAINING LITHIUM, MAGNESIUM OR CALCIUM SALTS OF SULFONATED POLYSTYRENE

[75] Inventors: Robert Alden Lofquist; John Christopher Haylock, both of Richmond, Va.

[73] Assignee: Allied Chemical Corporation, Morris Township, N.J.

[21] Appl. No.: 762,597

[22] Filed: Jan. 26, 1977

Related U.S. Application Data

[63] Continuation-in-part of Ser. No. 542,991, Jan. 22, 1975, abandoned, which is a continuation-in-part of Ser. No. 436,249, Jan. 24, 1974, abandoned.

[51] Int. Cl.$^2$ ............................................. C08L 77/00
[52] U.S. Cl. ........................ 260/857 UN; 260/78 SC
[58] Field of Search ................................. 260/857 UN

[56] References Cited

U.S. PATENT DOCUMENTS

| | | | |
|---|---|---|---|
| 2,676,896 | 4/1954 | Cohen | 260/857 |
| 3,190,763 | 6/1965 | Schleede | 260/DIG. 17 |
| 3,213,053 | 10/1965 | Kendrick | 260/DIG. 17 |
| 3,472,819 | 10/1969 | Stephens | 260/857 |
| 3,514,498 | 5/1970 | Okazaki | 260/857 |
| 3,553,286 | 1/1971 | Murata | 260/857 UN |
| 3,665,054 | 5/1972 | Burrows | 260/857 UN |

*Primary Examiner*—Paul Lieberman
*Attorney, Agent, or Firm*—Richard A. Anderson

[57] ABSTRACT

This invention discloses the improved method of making nylon cationic dyeable whereby the soluble lithium, magnesium or calcium salt of a sulfonated polystyrene is added, to provide improved lightfastness and ozone resistance over conventional cationic dyeable nylon.

30 Claims, No Drawings

OZONE RESISTANT, CATIONIC DYEABLE NYLON CONTAINING LITHIUM, MAGNESIUM OR CALCIUM SALTS OF SULFONATED POLYSTYRENE

CROSS REFERENCE TO RELATED APPLICATIONS

This application is a continuation-in-part of U.S. Ser. No. 542,991, filed Jan. 22, 1975, which is a continuation-in-part of U.S. Ser. No. 436,249, filed Jan. 24, 1974 both now abandoned.

BACKGROUND OF THE INVENTION

This invention relates to synthetic fiberforming polyamides, and shaped articles therefrom, which have excellent affinity for basic or cationic dyestuffs.

It is an object of this invention to provide a new and useful polyamide. These polyamides are useful as shaped articles, particularly fibers which can be made into a textile fabric such as carpet. Another object is to provide a shaped article which has increased affinity to cationic dyes.

Ozone fading of cationic dyed polyamide yarn in carpet has become a serious problem to the industry. Another object is to provide a cationic dyed polyamide which has increased resistance to ozone fading, improved wash fastness and increased dyed lightfastness.

The salts of this invention are soluble in water, in contrast to the water-insoluble salts which are described as preferred in U.S. Pat. No. 3,665,054. The polysulfonic acids described in that patent have a lower degree of sulfonation, less than 50 percent, compared to the polysulfonic acid described here which is at least 90 percent sulfonated.

The salts of polystyrene sulfonic acid in which the styrene is sulfonated to a high degree have been reported to be insoluble in nylon. This insolubility is described in U.S. Pat. No. 3,553,286, which states that a vinyl polymer having pendant sulfonic acid groups in which the whole of the sulfonic acid group is present in the form of an alkali metal (Li, Na, or K) or calcium salt has bad compatibility with polyamide. We have confirmed that the sodium salt and the potassium salt do indeed have poor compatibility with nylon 6. This is shown below by Examples 1, 2, 3 and 4.

Also, in certain competitive dyeing situations, the cationic dyeable polymer yarn containing highly sulfonated polystyrene will pick up an undesired anionic dye. This undesirable pick-up is called cross staining.

SUMMARY OF THE INVENTION

We have found, to our surprise, that the lithium, magnesium, and calcium salts, or their mixtures, of polystyrenesulfonic acid in which the benzene rings are predominantly sulfonated, are water soluble, compatible with nylon 6, and yet largely retained by the nylon despite aqueous treatments such as leaching the polymer pellets, and dyeing the yarn.

Also, to our surprise, the nylon 6 yarn made of the polymer containing the additives of the method of this invention has greatly improved resistance to fading due to ozone in the atmosphere.

The invention is a method to provide a polyamide article which contains a small amount of the lithium, magnesium, or calcium salt of a polystyrenesulfonic acid. The preferred salt is that of lithium because of increased yarn brilliance compared to the magnesium or calcium salts.

The preferred molecular weight for the salt of polystyrenesulfonic acid is from about 15,000 or, preferably, about 30,000 to about 300,000. The lower limit is fixed by the requirement for it to be retained by the nylon through the wet processing. The upper limit is proposed because the salt is most conveniently handled as an aqueous solution, and a very high molecular weight polymer gives a solution which is quite viscous at economical concentrations.

The pH of the polystyrenesulfonic acid salt in a 30 percent aqueous solution must be adjusted to between 3 and 8. At lower pH's the acid decomposes at temperatures above 100° C. At higher pH's the color of the salt solution becomes green, and any polymer made with this solution is off color. Use of the acid, such as claimed in U.S. Pat. No. 3,665,054, is not workable due to this discoloration and slow polymerization.

The polystyrenesulfonic acid salt is preferably added to the polyamide precursor as an aqueous solution, although a dry salt can be used, and then this mixture together with light stabilizers such as manganese salts, polymer molecular weight regulators such as acetic acid, sebacic acid, azelaic acid, or 5-sulfoisophthalic acid, and delustrants, if desired, is subjected to polymerization conditions. The order of addition is not important, that is, the polystyrenesulfonic acid could be first added to the polyamide precursor, then the lithium, magnesium and/or calcium ion can be added in the form of, for example, their oxides, hydroxides and/or carbonates, to form the salt of the polystyrenesulfonic acid. The preferred concentration of sulfonates present is between 50 and 150 equivalents per $10^6$ grams, but up to about 600 equivalents can be used in a master batch.

The molecular weight regulator can also be any carboxylic acid or ester bearing an aromatic sulfonic or polysulfonic acid or alkaline metal salt thereof such as sulfonated 2-benzoylbenzoic acid,
sulfonated 2-bibenzylcarboxyl acid,
sulfonated phenylacetic acid,
sulfonated o-phenoxybenzoic acid,
sulfonated phenoxyacetic acid,
sulfonated benzoic acid, or
sulfonated 4-benzylbenzoic acid
and the alkaline metal salts of them. More specifically, the molecular weight regulator can be a compound of the structure

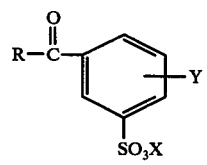

wherein X is Li, Na, K or $NH_4$, Y is H or

The carboxyl groups are not ortho to one another, and R is OH, Cl, $OCH_3$ or $OC_2H_5$.

When the sulfonated styrene salt is combined with a molecular weight regulator, the most preferred range of concentration in the polymer is from about 40 to about 80 equivalents per $10^6$ grams of polymer as shown in the final examples, Tables I and II. However, still preferred is a range of from about 20 to about 100 equivalents per $10^6$ grams of polymer to achieve a polymer with highly improved cross staining yet superior ozone resistance. The total sulfonates would still remain between 40 and 180 equivalents per $10^6$ grams polymer in these combinations of salt and regulator.

The polymerization is done under conditions normally employed for producing polyamides. Polymerization can be initiated by steam under pressure as in the case of nylon 6. The met is then held under atmospheric pressure until it reaches the desired degree of polymerization. The polymer is either subjected to high vacuum to remove unreacted monomer, or extruded as strands which are pelletized and water-extracted to remove unreacted monomer.

As an alternative to addition of the salt to the polymer precursor, an aqueous solution of the salt can be coated on polymer chips and the water taken off by evaporation. The polymer with the polystyrene-sulfonic acid salt can be shaped into an article or spun into fibers by spinnerettes containing the normal filtering sand packs or sintered metal. The pressure drop through the spinnerette was no greater than the control yarn without any additive.

The undrawn yarn when wound gives bobbins or other carriers having excellent package formation. That is, the bobbins or spools are wound uniformly with no tendency to slough off yarn.

The drawn yarn has an excellent affinity for cationic dyes. The uptake for some cationic dyes, for example, "Sevron Yellow 8-GMF",

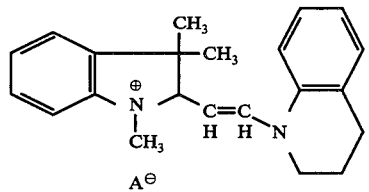

where A is an anion, is proportional to the equivalents of sulfonate in the yarn. Other cationic dyes, for example, Astrazon Blue 3-RL, identified in U.S. Pat. No. 3,794,464, are essentially exhausted from the dye bath, and are not affected by the number of sulfonate equivalents within a range of 30 to 180-gram equivalents of sulfonate per $10^6$ grams of polymer. The uptake of disperse dyes is not materially affected by the amount of sulfonate in the yarn. Uptake of acid dyes can be inhibited by the use of a monocarboxylic acid or dicarboxylic acid as a molecular weight regulator which also decreases the concentration of amine ends, preferably to 15–25-gram equivalents per $10^6$ grams.

The dyed yarn made using these salts of polystyrene-sulfonic acid also has excellent resistance to ozone fading compared to the cationic dyeable polymer made with 5-sulfoisophthalic acid.

The sulfonated polystyrene can be prepared according to U.S. Pat. No. 3,072,618.

This invention is an improvement on the prior art method to make a fiber-forming synthetic linear polyamide having a repeating structure of

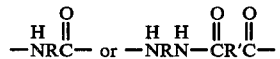

where R and R' are radicals of 3 to 13 carbon atoms receptive to cationic dyes by the addition of a sulfonated polystyrene or salt thereof. These prior art polyamides have from about 10 to about 60 amine gram-equivalents per $10^6$ grams of polymer and a ratio of less than 10 sulfonate gram-equivalents per amine gram-equivalent. The improvement is adding to the polyamide a water-soluble salt of a highly sulfonated polystyrene selected from the group consisting of lithium, magnesium and calcium salts. A 30 percent aqueous solution of the salt should have a pH of between about 3 and about 8. Then the shaped article is made such as by spinning to fiber. The salt should preferably be sulfonated to over 90 percent of the theoretical maximum of complete monosulfonation of of each styrene residue moiety. The salts of this invention can also be added to the polyamide precursors prior to polymerization, then the precursors are polymerized and the polymer is shaped by such methods as spinning to a fiber. The cationic-dyed polyamide fibers of this invention have highly improved resistance to fading of the cationic dye due to exposure to ozone. The method of testing for ozone fading is similar to the AATCC Test 129-1968 set forth on page 334/15 of *The Journal of American Association of Textile Chemists and Colorists*, July 30, 1969, Volume 1, No. 16, in an article entitled, "A New Test Method for Ozone Fading at High Humidity", by Victor S. Salvin.

The method and the means of measuring the loss of dye consists in dyeing the yarn with a selected dye or dyes, exposing it to ozone at a concentration of 20 parts per hundred million in a test chamber together with a control nylon sample which was dyed an avocado shade. The control sample is examined periodically until the resulting color corresponds to that of the Standard of Fading (one cycle). It has been found that one cycle is completed when the internal standard has faded sufficiently to give a $\Delta E$ of 2.8, compared to the unexposed standard.

$\Delta E$ is a measure of the change of color between two samples, a smaller $\Delta E$ being a closer match, or less fading of one sample compared to the second sample.

This color difference, $\Delta E$, was measured with a Hunterlab Color Difference Meter. This instrument measures color as seen in average daylight in a manner similar to the way in which the human eye responds to the stimulus of color. Experimentation has shown that the eye can match any color with a combination of three "primary" colored lights, and, therefore, that any color can be specified by a three-dimensional identification. The Color Difference Meter measures the light reflected by a specimen through filters that correspond to the three "primary" lights. These measurements made correspond to the way the average human eye responds to light.

$$\Delta E = \sqrt{(\Delta L)^2 + (\Delta a)^2 + (\Delta b)^2}$$

where
$\Delta L$ is $L_1 - L_2$ $\Delta a$ is $a_1 - a_2$ $\Delta b$ is $b_1 - b_2$ and L, *a*, and *b* are readings on the Hunterlab Color Difference Meter. "L" is a 100 to 0 reading of white to black; "*a*" indicates redness when positive, gray when zero, and green when negative; "*b*" indicates yellow when positive, gray when zero, and blue when negative.

The yarns containing the salts of polystyrene sulfonic acid of this invention also have improved dye wash fastness, and dye light fastness, compared to cationically dyeable nylon made with salts of 5-sulfoisophthalic acid.

These advantages of the subject invention and the methods of practicing the invention are shown in the following examples. The pH of the salts used in the examples was about 6 on a 30 percent aqueous solution, if not given.

DESCRIPTION OF PREFERRED EMBODIMENTS AND COMPARATIVE EXAMPLES

EXAMPLE 1 (Comparative)

29.5 Grams of the sodium salt of sulfonated polystyrene was dissolved in 100 grams of water. The molecular weight of the polymeric salt is about 70,000. (This material is available commercially from National Starch and Chemical as Versa TL-70.) The pH of a 30 percent aqueous solution varies from 5.5 to 7.5. This aqueous solution was added to 1520 grams of caprolactam. 6.8 Grams of sebacic acid was added as a molecular weight regulator. The solution was homogeneous. Then 80 grams of epsilon-aminocaproic acid was added as a polymerization initiator, and the mixture was poured into a 3-liter agitated glass reactor equipped with a heating mantle. The mixture was heated over a period of about 1.5 hours under a nitrogen blanket (50 cc. of nitrogen gas per minute) to 255° C. As the water flashed off the polymerization mixture, the sodium salt of polystyrenesulfonic acid separated from the lactam. At the end of 12 hours, a polymer ribbon was extruded from the bottom of the reactor which was pale yellow and full of white lumps. Unreacted caprolactam was removed by water extraction and dried. The washed and dried polymer was submitted for analysis. The formic acid relative viscosity was 69, with 65 equivalents of carboxyl and 20 equivalents of amine per $10^6$ grams. Sulfur analysis by X-ray fluorescence showed 1740 parts per million sulfur, or about 54 equivalents of sulfur per $10^6$ grams. Spinning of this polymer into fiber was precluded by the large amounts of insoluble "unspinnable chunks" in the polymer even after washing.

EXAMPLE 2 (COMPARATIVE)

20 Grams of the same sodium salt of polystyrene sulfonic acid was dissolved in 100 grams of water and this solution was poured over 1000 grams of a nylon 6 polymer of about 70 formic acid relative viscosity. The mixture was tumble-dried under vacuum to coat the nylon 6 pellets with the salt. The dried polymer was submitted for spinning. It was fed into a 1-inch diameter extruder, which delivered molten polymer to a metering pump, and then to a filtering sand pack. The extruder, pump, and sand pack were heated to about 270° C. and the polymer fed into the extruder. After about 5 minutes, the pressure drop across the sand pack was so great that the support for the sand pack broke, sending fine sand and dark brown polymer through the spinnerette holes. A repeat with a reduced sand pack had the same result. The polymer without any coating had spun well, without discoloration immediately prior to the first mentioned spinning attempt, with the full sand pack.

EXAMPLE 3 (COMPARATIVE)

15 Grams of the sodium salt of polystyrenesulfonic acid of about 500,000 molecular weight was dry blended with 1000 grams of a nylon 6 polymer of about 70 relative viscosity in formic acid, 70 carboxyl equivalents, and 16 amino equivalents per $10^6$ grams of polymer. This polymer was fed into the same spinning system as described in Example 2. As in Example 2, the pressure drop through the sand rose rapidly and the sand pack broke. After the sand pack broke, sand and black polymer came through the spinnerette holes.

A similar polymer, but without the polystyrene sulfonate, had been spun immediately preceding the above blend without excessive pressure drop or polymer discoloration.

EXAMPLE 4 (COMPARATIVE)

68.5 Grams of a 30 percent solution of sulfonated polystyrene of about 70,000 molecular weight was neutralized by the addition of 8.22 grams of potassium hydroxide. (This polystyrene sulfonic acid is available from National Starch and Chemical as Versa TL-71).

This aqueous solution was added to 1520 grams of caprolactam. 6.0 Grams of sebacic acid was added as a molecular weight regulator. The solution was homogeneous. The solution, together with 80 grams of epsilon-aminocaproic acid was poured into an agitated reactor and subjected to polymerization conditions as described in Example 1. As in Example 1, when the water was boiled off the potassium salt of polystyrenesulfonic acid separated as white lumps in the molten polymer, confirming the contention in U.S. Pat. No. 3,553,286 that the potassium salt has bad compatibility with polyamide.

When the polystyrenesulfonic acid was neutralized with zinc carbonate or gelatinous aluminum hydroxide, the same incompatibility was observed.

EXAMPLE 5

A solution of the lithium salt of polystyrenesulfonic acid was prepared by dissolving 3.46 grams of lithium carbonate in 57.5 grams of a 30 percent aqueous solution of a 70,000 molecular weight polystyrenesulfonic acid which also contained 0.1 gram of Dow Corning Antifoam 35 to reduce foaming. This entire solution was added to 1520 grams of caprolactam at 90° C. Manganese chloride (0.0576 gram) and 0.1640 gram of a 50 percent aqueous solution of hypophosphorus acid were added to serve as light stabilizers. The solution was homogeneous.

This solution was poured into a 3-liter agitated glass reactor equipped with a heating mantle, and a gas inlet and outlet to provide a nitrogen blanket over the molten mixture. 80 Grams of epsilon-aminocaproic acid was added as a polymerization initiator. The mixture was then heated over a period of about 1.5 hours to about 255° C. When the water flashed off, there was no phase separation.

At the end of 4.75 hours a polymer ribbon was extruded from the bottom of the reactor which was a pale yellow, without lumps, and of constant cross section. Unreacted caprolactam, about 10 percent by weight, was removed by water extraction. The washed and dried polymer was submitted for analysis.

The formic acid relative viscosity was 65, with 72 equivalents of carboxyl and 31 equivalents of amine per $10^6$ grams of polymer. Sulfur analysis by X-ray fluorescence of the washed and dried polymer showed 2150 parts per million sulfur, or about 67 equivalents of sulfur per $10^6$ grams of polymer. A sample of the unwashed polymer contained about 2400 parts per million sulfur. The theoretical concentration of sulfur, based on the amount of polystyrenesulfonic acid salt added, was 2240 parts per million.

The polymer was submitted for spinning. It was spun using the same spinning equipment as described in Example 2. The spinnerette had 14 holes each in the shape of a "Y" to get a yarn with a "Y" cross section. The spinning temperature was about 275° C. Pressure drop across the sand pack in the spin pot was about 5900 psi.

The undrawn yarn had a total denier of 705 or an average of 50 denier per filament. The free fall yarn had a formic acid relative viscosity of 54, with 71 carboxyl equivalents and 24 amine equivalents per $10^6$ grams of polymer. Five ends of this yarn were gathered and drawn to 3.2 times the spun length, and then 2-plied to give a yarn of 2260 total denier. This yarn had a tensile strength of 3.1 grams per denier and an ultimate elongation of 45 percent. A control yarn (pure nylon 6) spun at the same time had a tensile strength of 3.3 grams per denier and an ultimate elongation of 53 percent.

A control yarn was made from a nylon 6 polymer having a formic acid relative viscosity of 46, about 90 carboxyl equivalents per $10^6$ grams, about 25 amine equivalents with about 81 sulfonate group equivalents, from the sodium salt of sodium 5-sulfoisophthalate. It was spun on the same spinning equipment as described above, drawn, knitted into sleeves, and autoclaved at 270° F., that is, heat set.

Autoclaving consisted of putting the knitted sleeves into an autoclave, evacuating the chamber to 27 inches of vacuum and introducing steam to heat the chamber to 230° F. The chamber is held at 230° F. for 5 minutes, and the pressure released. The chamber is then repressurized with steam to heat to 230° F. The pressure is held for 5 minutes and released. Then steam is introduced and the temperature is allowed to rise to 270° F. The pressure is released and then steam is put in again until the temperature is 270° F. It is held for 5 minutes and again the pressure released. Then it is repressurized to give a temperature of 270° F. for 8 minutes. The pressure is then released and the yarns removed from the autoclave.

The yarns were dyed in separate dye baths to a moss green shade in a dye bath composed as follows:

0.3% (OWF) Sevron Yellow 8-GMF (duPont)
0.25% (OWF) Sevron Blue GCN (duPont), C. I. Basic Blue 97
2.0% (OWF) Hipochem PND-11 (amine salt of an alcohol ester)
1.0% (OWF) Hipochem CDL-60 (nonionic surfactant)

and monosodium and/or disodium phosphate to adjust the pH of the dye bath to 7.0 ± 0.2. OWF means on the weight of the fiber.

The dyed sleeves were then exposed for 6, 12, and 18 hours in an atmosphere of about 20 parts per hundred million of ozone, at a temperature of 104° F., at a relative humidity of 95–100 percent.

The results of ozone exposure are listed below:

|  | ΔE | | |
|---|---|---|---|
|  | 6 Hours | 12 Hours | 18 Hours |
| (a) Control - polymer with 5-sulfoisophthalate | 6.2 | 10.2 | 14.2 |
| (b) Polymer with lithium salt of polystyrene sulfonic acid | 0.8 | 2.2 | 2.5 |

The undyed sleeves described above were also dyed in a second set of dye baths where 0.25 percent of Astrazon Blue 5-GL, C. I. Basic Blue 45 was substituted for 0.25 percent of Sevron Blue GCN, C. I. Basic Blue 97 which has the formula

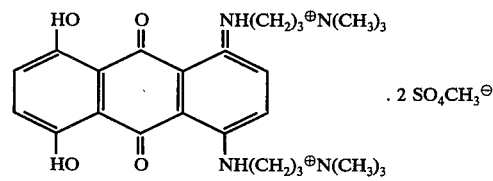

These dyed sleeves were also exposed to 6, 12, and 18 hours in the above ozone chamber. The results of ozone exposure were:

|  | ΔE | | |
|---|---|---|---|
|  | 6 Hours | 12 Hours | 18 Hours |
| (a) Control - Polymer with 5-sulfoisophthalate | 6.3 | 12.1 | 16.6 |
| (b) Polymer with the lithium salt of polystyrenesulfonic acid | 1.6 | 3.5 | 4.8 |

Exposure of a third set of dyed yarns where Astrazon Blue 3RL (C. I. Basic Blue 47) was substituted for Astrazon Blue 5GL gave ΔE's generally around 3 to 4 after 18 hours.

The yarn with the lithium salt of polystyrenesulfonic acid, and the yarn with 5-sulfoisophthalic acid sodium salt were also dyed with 0.5 percent (OWF) Astrazon Blue 5GL and exposed to xenon light in an Atlas Weatherometer for 60 hours. The former yarn took 40 hours to get a color "break", while the latter broke in only 20 hours. By "break" or "broke" is meant a noticeable change in color or shade of the sample exposed compared to an adjacent unexposed portion.

EXAMPLE 6

38 Grams of a neutral dry mixture of lithium carbonate and a polystyrenesulfonic acid of about 70,000 molecular weight, which also contained about 10 percent sulfuric acid, was dissolved in 100 grams of water. This was added to 1520 grams of caprolactam at 90° C. 0.0576 Gram of manganous chloride and 0.1640 grams of a 50 percent aqueous solution of hypophosphorous acid and 8.0 grams of sebacic acid were added, and the clear, homogeneous solution was poured into a 3-liter agitated reactor. 80 Grams of epsilon-aminocaproic acid was added and the material was subjected to polymerization conditions as in Example 5.

After 9.5 hours of polymerization, the polymer was leached and dried. Analysis of the polymer gave a formic acid relative viscosity of 38.6, with 93 carboxyl equivalents and 25 amine equivalents per $10^6$ grams of polymer. The sulfur analysis showed 2960 parts of sulfur per million parts polymer, i.e., 92.5 equivalents of sulfonate groups per $10^6$ grams of polymer.

The polymer was spun in the same manner as was the polymer of Example 5. The spin pot temperature was 255° C., pressure drop across the filter in the spin pot was 2300 psi. The undrawn yarn, total denier 712, was taken up at a speed of 990 feet per minute. The free fall yarn had a formic acid relative viscosity of 36, with 3000 parts of sulfur per million parts of polymer. Five ends of the undrawn yarn were gathered and drawn to about 3.2 times the spun length, and then 2-plied to give a yarn of 2270 total denier. This yarn had an ultimate elongation of 46 percent, and a breaking strength of 2.5 grams per denier.

A control yarn made from the same type of polymer as the control yarn of Example 5 was spun immediately preceding the above yarn. The yarn takeup speed was 965 feet per minute to give an undrawn yarn of 720 denier. Pressure drop across the spin pot was 1700 psi. The undrawn yarn was gathered, drawn and 2-plied as above to give a yarn of 2300 total denier. This control yarn had an ultimate elongation of 48 percent, and a breaking strength of 30 grams per denier.

These yarns were knitted into sleeves, autoclaved at 270° F. as detailed in Example 5, and dyed in separate dye baths, each containing 0.2 percent Sevron Blue GCN (OWF). The dye pickup was similar, but the yarn containing the lithium salt of polystyrenesulfonic acid exhausted the dye bath, while the control yarn left some blue dye in solution.

Sections of both sleeves were also dyed to a moss green shade in a dye bath made up as the first mentioned bath of Example 5, i.e., containing 0.25 percent Sevron Blue GCN, etc. They were then submitted for exposure to 20 parts per hundred million of ozone for three cycles.

The results of ozone exposure were:

| | ΔE |
|---|---|
| (a) Control yarn -containing 81 equivalents of sulfonate from 5-sulfoisophthalic sodium salt | 16.4 |
| (b) Polymer with the lithium salt of polystyrenesulfonic acid | 3.0 |

EXAMPLE 7

1800 Grams of a 30 percent solution of polystyrenesulfonic acid was neutralized with a 5 normal solution of lithium hydroxide. The polystyrenesulfonic acid had a molecular weight of about 70,000.

300 Grams of the above solution was added to 1520 grams of caprolactam at 90° C., containing 0.0576 gram of manganous chloride and 0.1640 gram of a 50 percent solution of hypophosphorous acid to give a clear, colorless solution. This solution was poured into a 3-liter agitated reactor. 80 Grams of epsilonaminocaproic acid and 6.0 grams of sebacic acid were added, and the mixture was subjected to polymerization conditions similar to those of Example 5.

At the end of 8.75 hours a polymer strand was taken from the bottom of the reactor. The strand was pelletized, washed to remove lactam, and dried. The resulting polymer had a relative formic acid viscosity of 38, with 84 carboxyl equivalents and 28 amine equivalents per $10^6$ grams of polymer. Sulfur analysis by X-ray fluorescence showed 5700 parts per million sulfur.

The polymer was spun in a manner similar to that described in Example 5. Spinning temperature was 280° C. Pressure drop across the spin pot filter was 1700 psi. The undrawn denier was 727. After gathering five ends together, drawing, and 2-plying, the resulting yarn had a total denier of 2350. The relative formic acid viscosity was 43, and the sulfur content was analyzed to be 5510 parts per million. The yarn had an ultimate elongation of 37 percent, and tensile strength of 2.7 grams per denier.

The yarn was knitted into sleeves, autoclaved at 280° F., as in Example 5, and dyed to a moss green shade in a dye bath which formulation was identical to the first mentioned dye bath in Example 5.

The dyed sleeve together with a control sleeve similar to that of Example 5, which had been dyed in a dye bath containing the same formulations were then exposed to ozone. Ozone concentration was 20 parts per hundred million.

The results of exposure for 6, 12, and 18 hours are as follows:

| | ΔE | | |
|---|---|---|---|
| | 6 Hours | 12 Hours | 18 Hours |
| (a) Control | 7.5 | 12.0 | 15.2 |
| (b) Yarn with lithium polystyrenesulfonate | 0.2 | 0.5 | 1.5 |

The same yarns were dyed with 0.5 percent Astrazon Blue 5-GL and exposed to xenon light for 10–60 hours. The control yarn took 20 hours to develop a color break; the yarn of this invention took 40 hours to break.

EXAMPLE 8

A nylon polymerization similar to that described in Example 6 was carried out where 24.8 grams of the lithium salt of a polystyrenesulfonic acid of 120,000 molecular weight was used instead of the polystyrene sulfonate used in Example 6.

After 9 hours at 255° C., the polymer produced had a sulfur content before washing of 2636 parts per million. The polymer was washed to remove monomer and dried. Analysis of the washed and dried polymer showed a relative formic acid viscosity of 52, with 76 carboxyl equivalents and 20 amine equivalents per $10^6$ grams of polymer. The sulfur analysis showed 2342 parts per million of sulfur.

The polymer was spun into fibers using the same equipment and in the same manner as that of Example 5. Spinning temperature was 255° C., pressure drop across the spinning filter was 2500 psi. Undrawn yarn of 724 denier, 14 filaments was taken up at 965 feet per minute. Five ends of undrawn yarn were gathered, drawn to about 3.2 times the spun length, and 2-plied to give a yarn of 2330 denier with 140 filaments. The yarn had an ultimate elongation of 50 percent, and a tensile strength of 310 grams per denier.

EXAMPLE 9 (COMPARATIVE)

A nylon polymerization was carried out similar to that described in Example 6, but with 29.5 grams of a neutral dry mixture of sodium carbonate and a polystyrenesulfonic acid of about 70,000 molecular weight, instead of a mixture containing lithium carbonate.

After about 9 hours of exposure to polymerization conditions, the polymer was leached and dried. The analysis of the polymer showed a relative formic acid of about 56, with 74 carboxyl equivalents and 24 amine equivalents per million grams of polymer. Sulfur analysis showed 2620 parts sulfur per million parts polymer.

The polymer was spun in the same manner as was the polymer of Example 5. The spin pot temperature was about 260° C., and pressure drop across the spin pot filter was greater than 6000 psi. A small package of yarn was collected having an undrawn denier of 716. Five ends of yarn were gathered together, drawn to about 3.2 times the spun length, and then 2-plied to give a yarn of 2270 total denier. This yarn had an ultimate elongation of 43 percent and a tenacity of 3.0 grams per denier.

The high pressure drop across the spinning filter showed that this additive could not be used commercially, i.e., for long spinning runs.

EXAMPLE 10

A solution of the magnesium salt of polystyrenesulfonic acid was prepared by dissolving 4.81 grams of magnesium carbonate in 70.2 grams of a 30 percent solution of a 70,000 molecular weight polystyrenesulfonic acid, which contained 0.1 gram of Dow Corning antifoam 36. This solution was added to 1520 grams of caprolactam, and the same additives and initiator as were used in Example 5. This mixture was then exposed to polymerization conditions, leached and dried as described in Example 5.

Polymerization time was 10 hours, and the polymer had a relative formic acid viscosity of 38, with about 100 carboxyl equivalents and about 20 amine equivalents per million grams of polymer, and about 2600 parts sulfur per million parts polymer.

The polymer was spun using the same spinning equipment described in Example 2. Spinning temperature was 240° C., and pressure drop across the sand pack was 2300 psi. The undrawn yarn was taken up at 980 feet per minute. Undrawn denier was 715. Five ends of the yarn were gathered, drawn about 3.2 times the undrawn length and 2-plied to give a yarn of 2295 total denier. The yarn had an ultimate elongation of 52 percent, and a tenacity of 2.6 grams per denier.

A control yarn, made with the sodium salt of 5-sulfoisophthalic acid was spun. It had an ultimate tensile strength of 3.1 grams per denier and 46 percent ultimate elongation. This control yarn was similar to the control yarn of Example 5.

The yarn of this example and the above control yarn were autoclaved at 270° F. as in Example 5, dyed comparatively in dye baths similar to the first mentioned dye bath of Example 5, but with 0.25 percent OWF Astrazon Blue 3-RL instead of 0.25 percent (OWF) Sevron Blue GCN. The dyed sleeves, a deep green color, were then exposed to ozone as described in Example 5. The results of this exposure were as follows:

|  | ΔE |
|---|---|
| (a) Control yarn - containing 5-sulfoisophthalate | 7.5 |
| (b) Yarn containing the magnesium salt of polystyrenesulfonic acid | 1.5 |

EXAMPLE 11

A solution of the calcium salt of polystyrenesulfonic acid was prepared by dissolving 7.3 grams of calcium carbonate in 68.5 grams of a 30 percent solution of a polystyrenesulfonic acid of 70,000 molecular weight.

This solution was added to 1520 grams of caprolactam, and the same additives and initiator were used as described in Example 5. This mixture was then exposed to polymerization conditions, and the resulting polymer leached and dried as described in Example 5.

Polymerization time was about 5.5 hours. The molten polymer which was cloudy during the first part of polymerization gradually became clear. The polymer was colorless.

The polymer had a relative formic acid viscosity of 59, with 67 carboxyl equivalents and 21 amine equivalents per million grams of polymer, and about 2300 parts of sulfur per million parts of polymer.

The polymer was spun as described in Example 5. Spinning temperature was 280° C., and pressure drop across the sand pack was 4000 psi, rising from 3600 psi over a half hour of spinning. The undrawn yarn, 683 denier, was taken up at 990 feet per minute. The yarn was drawn at a draw ratio of 3.2 as described in Example 5, and plied to a total denier of 2220. The drawn yarn had an ultimate elongation of 47 percent, and a tenacity of 2.8 grams per denier.

This yarn and a control yarn similar to that described in Example 10 were autoclaved at 270° C., as in Example 5, and then dyed in dye baths similar to the bath described in Example 10. The dyed yarns were then exposed to ozone as described in Example 5. The results of ozone exposure were as follows:

|  | ΔE |
|---|---|
| (a) Control | 16.4 |
| (b) Yarn containing the calcium salt | 3.3 |

EXAMPLE 12

A solution of the lithium salt of polystyrenesulfonic acid was prepared by dissolving 3.7 pounds of lithium carbonate in 47.5 pounds of a 30 percent solution of a 70,000 molecular weight polystyrenesulfonic acid.

This solution was added to a solution of 18 grams of manganous chloride tetrahydrate, 23 grams of a 50 percent solution of hypophosphorus acid, and 5.9 pounds of sebacic acid in 1045 pounds of caprolactam.

The solution was put into an agitated polymerization reactor, and the reactor was pressurized with 50 pounds of steam. The pressure dropped to atmospheric after an hour, and nitrogen gas was passed over the melt for about 10 hours. Then the polymer was extruded from the reactor, pelletized, leached to remove residual monomer and then dried. The resulting polymer had a relative formic acid viscosity of 47.1, with 85 carboxyl equivalents, and 22 amine equivalents per million grams of polymer. The sulfur content was 2450 parts per million.

The polymer was spun using a commercial type extruder feeding a metering pump which forced polymer through a filtering sand pack and to a spinnerette. Spinning temperature was about 250° C. Polymer was spun for ten hours at about 40 pounds per hour. Pressure drop across the sand pack was steady at about 2000 psi. There was no increase in pressure over the ten-hour period.

EXAMPLE 13 (COMPARATIVE)

68.5 Grams of a 30 percent solution of a polystyrenesulfonic acid of 70,000 molecular weight was added to 1520 grams of caprolactam. The same additives and initiator were used as described in Example 6. This mixture was poured into a 3-liter agitated reactor and held under polymerization conditions as described in Example 5 for 5.5 hours. At the end of this time, almost no polymerization had taken place, and the molten mixture had become brown.

EXAMPLE 14 (MASTER BATCH)

A solution of the lithium salt of polystyrene sulfonic acid was made by adding 42.9 grams of lithium carbonate to 554 grams of polystyrene sulfonic acid of about 70,000 molecular weight. This solution was added to 1440 grams of caprolactam and 60 grams of epsilon-aminocaproic acid and subjected to polymerization conditions similar to those described in Example 5.

After 9 hours at 255° C. the resulting polymer was extruded from the bottom of the reactor. Analysis showed it to be about 2.1 percent sulfur. The polymer was pelletized, leached and dried. Analysis of this polymer gave a relative formic acid viscosity of 27, with 107 carboxyl equivalents and 36 amine equivalents per million grams of polymer. Sulfur analysis showed about 1.4 percent sulfur.

The polymer was then mixed with 5.67 times its weight of a nylon polymer of about 70 formic acid relative viscosity, 70 equivalents of carboxyl, and 15 equivalents of amine per million grams of polymer, and with no additives containing sulfur. The resulting blend had about 65 gram equivalents of sulfonate groups per $10^6$ grams of polymer. This polymer mixture was spun on the equipment described in Example 2. The polymer was spun at a temperature of 270° C., drawn to about 3.2 times its spun length and texturized.

The texturized yarn was tufted into a carpet, which had alternating bands of this yarn from the blend, and yarn spun from the 70 formic acid relative viscosity polymer mentioned above. This carpet was dyed in a dye bath containing 0.5 percent (OWF) Sevron Blue GCN, and the dye assists described in Example 5. There was excellent contrast between the different bands of yarn in the carpet.

EXAMPLE 15

22.4 Grams of the neutral dry mixture of lithium carbonate and polystyrenesulfocnic acid described in Example 6, and 9.6 grams of 5-sulfoisophthalic acid sodium salt were added to 1520 grams of caprolactam. The same light stabilizers and initiator were used as described in Example 6. This mixture was poured into a 3-liter agitated reactor and held under polymerization conditions as described in Example 5 for 9.25 hours.

The polymer was leached and dried as in Example 5. The washed and dried polymer had a formic acid relative viscosity of 58.6, and a sulfur content of 2610 parts per million.

The polymer was spun into yarn plied and drawn as described in Example 5 and then knitted into a sleeve.

This yarn, the yarn from Example 8, and a control yarn similar to the control yarn of Example 5, were autoclaved at 280° F. and then dyed in separate dye baths to a moss green shade as described in Example 5 but using Astrazon Blue 3RL instead of Sevron Blue GCN.

These dyed sleeves were then exposed to 3 cycles of ozone fading as in Example 6. The result of this exposure is as follows:

|     |                      | ΔE   |
|-----|----------------------|------|
| (a) | Yarn of this example | 5.9  |
| (b) | Yarn of Example 8    | 4.5  |
| (c) | Control yarn         | 13.2 |

DISCUSSION

Thus, as can be seen in the comparative Examples 1-4, 9 and 13, the sodium and potassium salts and the acids could not be melt-processed on a commercial basis to provide a cationic dyeable nylon. Such products cause plugging of filters, and spinnerettes. On the other hand, examples of the embodiment of this invention, Nos. 5-8, 10-12, and 14, show the lithium, magnesium and calcium salts are operable to make cationic dyeable nylon. This is a surprising result in light of the sodium and potassium analogous salts failure. They also, surprisingly, (a) provide highly improved resistance to fading of the cationic dye due to exposure of ozone as shown in the examples and (b) show an improved light-fastness and washfastness.

Comparative Examples 1-4 show that the analogous sodium salt whether as a solution in the lactam, the solution in the chips or dry on the polymer chips still will not work. The comparative examples also show that the potassium, zinc and aluminum salts do not work as in Example 4. Comparative Example 9 confirms that the sodium salt solution does not work and comparative Example 13 shows that the acid will not work. Surprising results are shown in Examples 5-8 with the lithium salt added to the solution in lactam, (a) starting with the sulfonic acid in solution, (b) as a dry mix with the lithium hydroxide, (c) with the lithium carbonate and (d) with 120,000 molecular weight polystyrenesulfonic acid. Example 10 shows magnesium works. Example 11 shows calcium works. Example 12 shows a long term spinning can be accomplished with the lithium salt in a large operation. The master batch is shown in Example 14. Example 15 shows the preferred molecular weight modifier. The preferred range of amounts of all the molecular weight modifiers is from about 25 to about 90 gram equivalents per $10^6$ grams of polymer.

The following example shows that at the prior art degree of sulfonation, i.e., below 90 percent, the lithium and the sodium salts are equivalent. It is only above 90 percent that the criticality of the nature of the cation, i.e., it must be Li, Ca, or Mg as shown in Examples 1 – 4 and 13 contrasted with Examples 5 – 12 and 14 – 15.

EXAMPLE 16 (COMPARATIVE)

Example 5 was repeated using the following polymers to be spun:

A. The control yarn from Example 5 having the sodium 5-sulfoisophthalate.

B. The lithium salt of polystyrenesulfonic acid, as in Example 5, but the polystyrene being only 70 percent monosulfonated.

C. The sodium salt of the same 70 percent sulfonated polystyrenesulfonic acid.

The three polymers were each spun 30 minutes consecutively under the conditions of Example 5 with the following results:

| Polymer | ppm of S* | FAV** | Pressure at Spinnerette, psi*** | Pressure Increase During Spinning |
|---|---|---|---|---|
| A | 2611 | 40 | 2600 | — |
| B | 2770 | 30.7 | 3000 | 400 |
| C | 3155 | 50.3 | 3400 | 400 |

*Parts per million of sulfur
**Formic acid viscosity
***Measured at end of run

In startling contrast to Examples 1-3, the prior art sodium salt of polystyrenesulfonic acid when only 70 percent sulfonated will spin without the tremendous pressure build-up caused by particles in the filter as indicated by the pressure across the spin pot.

EXAMPLE 17

The following example sets forth experiments to show how cross staining of cationic dyeable fibers or yarn of nylon 6 polymer in a competitive dyeing situation was overcome. This problem is present commercially when a bi-dye or tri-dye plied yarn containing two or three different polymer yarns having different dye affinities are dyed in the same dye bath to produce a multicolor yarn, such as in a dyed carpet. Ideally, yarn of each polymer in the plied yarn attracts only the type of and amount of dye in the dye bath that its polymer chemistry intends. However, occasionally a polymer attracts a dye not intended to be absorbed. For instance, nylon containing the salt of polystyrene sulfonic acid can, in certain dyebaths, attract both the cationic and an unwanted anionic dye. This undesirable pickup of anionic dye is called cross staining. Another solution to the problem is described in U.S. Pat. No. 3,846,507.

Cross Staining Experiment

The experimental cationic dyeable fibers were competitively dyed on an equal weight basis with an acid dyeable fiber in a dyebath containing the following formulation (on weight of fabric).
0.35% Telon Blue ANL (C.I. 62055) C.I. Acid Blue 25
2.0% Ammonium sulphate
0.5% Acetic Acid
1.0% Leveling agent (Sandogen CCM)
40:1 liquor ratio, 2° F. per minute bath temperature rose to 205° F., held at 205° F. for 1 hour.

The amount of this acid dye on each fiber was estimated by dissolving the fiber in trifluorethanol and comparing the intensity of the maximum absorptions of the dye in the visible region of the spectrum measured on an ultraviolet spectrometer by measuring the height of absorption peaks on the chart from the machine. Table I lists the relative percentages of acid dye staining the cationic fiber.

Ozone Fading Experiments

The experimental fibers were heat set at 270° F. and comparatively dyed with 0.5% (OWF) Astrazon Blue 5GL (C.I. Basic Blue 45). Individual skeins were exposed to an atmosphere containing 20 ppm ozone at 90% RH and 104° F. for 6, 12, 18, and 24 hours. The amount of dye on each fiber after each period of exposure was estimated by dissolving the fiber in trifluorethanol and comparing the intensity of the maximum absorption of the dye in the visible region of the spectrum, measured as above, with the maximum absorptions of an unexposed, dyed fiber. Table II lists the percentage of dye remaining on the fiber, averaged over the 24 hour exposure time.

Additive A below was the additive from the polymer described in Example 16, polymer A with the equivalents of sulfonate per $10^6$ gram of polymer shown. Additive D below was the additive from the polymer of Example 5 with the equivalents of sulfonate per $10^6$ grams of polymer shown.

TABLE I

| | STAINING | | |
|---|---|---|---|
| Sulfonate Eq. from Additive A | No Sulfonate Equivalent from Additive D % Dye Pick Up* | 40 Sulfonate Equivalent from Additive D % Dye Pick Up* | 80 Sulfonate Equivalent from Additive D % Dye Pick Up* |
| 0 | 50 | 32 | 26 |
| 5 | — | 31 | 22 |
| 10 | — | 26 | 20 |
| 20 | — | 16 | 20 |
| 40 | 28 | 15 | 14 |
| 80 | 12 | 12 | 12 |
| 160 | 7 | — | — |

*In a competitive dye bath given above, competing against a yarn of polymer of first entry of first column.

TABLE II

| | OZONE FADING | | |
|---|---|---|---|
| Sulfonate Eq. from Additive A | No Sulfonate Equivalent from Additive D % Dye Remaining | 40 Sulfonate Equivalent from Additive D % Dye Remaining | 80 Sulfonate Equivalent from Additive D % Dye Remaining |
| 0 | 70 | 87 | 95 |
| 5 | — | 85 | 89 |
| 10 | — | 81 | 92 |
| 20 | — | 88 | 93 |
| 40 | 66 | 84 | 89 |
| 80 | 65 | 79 | 82 |
| 160 | 51 | — | — |

The polymer spun into the fiber for the yarn tested for each piece of data in the above tables contained sulfonate from the sodium salt of 5-sulfoisophthalic acid in all cases except the first row across each Table. The polymer spun into the fiber for the yarn tested for each piece of data contained sulfonate from the lithium salt of polystyrene sulfonate in all cases except the first column (down) of each Table. Thus, the polymer for the data in the last two columns of both Tables, with the exception of the first entry in each column, contains a mixture of sulfonate additives. Additive A, sodium salt of 5-sulfoisophthalic acid is the molecular weight regulator when the additives are combined.

For points of reference, note the polymer of the first entry of the first column contains no sulfonate, and the polymer of the penultimate entry in the first column is a commercial nylon 6 cationic dyeable yarn. Note that the amount of dye remaining in the yarn after exposure to ozone decreases significantly with increasing amounts of Additive A sulfonates in the first column of Table II. To overcome this ozone fading, the sulfonate of Additive D can be used effectively, first row Table II. However, this gives unacceptable cross staining in certain dye baths as shown in the first row of Table I, in comparison to commercial nylon 6 cationic dyeable yarn.

Surprisingly, combining Additive A with Additive D in a polymer does not significantly diminish the improved ozone fading resistance attributed to Additive D yet does provide most of the greatly improved cross staining resistance attributed to Additive A.

TABLE III

| Equivalent of Additive | | Comparison to Commercial Cationic Nylon 6 (80 Equivalent Additive A 0 Equivalent Additive D) | |
|---|---|---|---|
| A | | Improved Staining | Improved Ozone |
| 80 | 0 (commercial) | 0 | 0 |
| 0 | 40 | -20 | 22 |
| 10 | 40 | -14 | 16 |
| 20 | 40 | -4 | 23 |
| 40 | 40 | -3 | 19 |
| 80 | 40 | 0 | 14 |
| 0 | 80 | -14 | 30 |
| 10 | 80 | -8 | 27 |
| 20 | 80 | -8 | 28 |
| 40 | 80 | -2 | 24 |
| 80 | 80 | 0 | 17 |

Particularly note the yarn of polymers containing 40—40 (A-D), 80–40, 40–80, and 80—80 equivalents of sulfonate have improved ozone fading by 14 to 24% with only a few percent loss of staining or no loss. The figures of Table III are the absolute percent difference, not a ratio, taken from Table I and Table II.

EXAMPLE 18

A solution of the lithium salt of polystyrenesulfonic acid was prepared by dissolving 5.334 grams of lithium hydroxide monohydrate in 200.4 grams of a 9 percent aqueous solution of a 500,000 molecular weight polystyrenesulfonic acid. The pH of this solution was 6.3. This entire solution was added to 1520 grams of caprolactam at 90° C. Manganese chloride (0.0576 gram) and 0.1640 gram of a 50 percent aqueous solution of hypophosphorous acid were added to serve as light stabilizers. The solution was homogeneous.

This solution was poured into a 3-liter agitated glass reactor equipped with a heating mantle, and a gas inlet and outlet to provide a nitrogen blanket over the molten mixture. 80 Grams of epsilon-aminocaproic acid was added as a polymerization initiator, and 6.8 grams of sebacic acid was added as a molecular weight regulator. The mixture was then heated over a period of about 1 hour to about 255° C. When the water flashed off there was no phase separation.

At the end of 7¼ hours a polymer ribbon was extruded from the bottom of the reactor, which was almost colorless, without lumps and of constant cross section. Unreacted caprolactam, about 10 percent by weight, was removed by water extraction. The washed and dried polymer was submitted for analysis.

The formic acid relative viscosity was 61, with 75 gram equivalents of carboxyl and 22 gram equivalents of amine per $10^6$ grams of polymer. Sulfur analysis by X-ray fluorescence of the washed and dried polymer showed 2095 parts per million sulfur, or about 65 equivalents of sulfur per $10^6$ grams of polymer. A sample of the unwashed polymer contained about 2090 parts per million sulfur. The theoretical concentration of sulfur, based on the amount of polystyrenesulfonic acid salt added was about 2100 parts per million.

The polymer was submitted for spinning. It was spun using the same spinning equipment as described in previous examples. The spinning temperature was about 265° C. Pressure drop across the sand pack in the spin pot was about 1600 psi.

The undrawn yarn had a total denier of 711 or an average of 50 denier per filament. The free fall yarn had a formic acid relative viscosity of 60, with 78 gram equivalents of carboxyls and 25 gram equivalents of amines per $10^6$ grams of polymer. Five ends were gathered and drawn to 3.2 times the spun length, and then 2-plied to give a yarn of 2250 total denier. This yarn had a tensile strength of 2.9 grams per denier and an ultimate elongation of 44 percent. A control yarn of nylon 6, not containing any sulfonate, but which contained a dicarboxylic acid as a molecular weight regulator had a tensile strength of 3.3 grams per denier and an ultimate elongation of 50 percent.

This yarn and a control yarn which had 81 gram equivalents of sulfonate groups per $10^6$ grams of polymer, similar to that described in Example 5, were knitted into to that described in Example 5, were knitted into sleeves, autoclaved as described in Example 5 and dyed in separate dye baths composed as was the dye bath of Example 5.

The dyed sleeves were then exposed for 6, 12 and 18 hours in an atmosphere of 20 parts per hundred million (v/v) of ozone at a temperature of 104° F. at a relative humidity of 95-100 percent.

The degree of ozone fading was determined by Gray scale readings. They were as follows:

| | Gray Scale Readings | | |
|---|---|---|---|
| | 6 Hours | 12 Hours | 18 Hours |
| (a) Control polymer | 4 | 3 | 1.2 |
| (b) Polymer with lithium salt of polystyrenesulfonic acid | 4.5 | 4 | 3 |

Higher Gray scale numbers indicate lesser degree of fading.

EXAMPLE 19

A solution of the lithium salt of polystyrenesulfonic acid was prepared by dissolving 6.28 grams of lithium hydroxide monohydrate in 67 grams of 34.8 percent aqueous solution of a 40,000 molecular weight polystyrenesulfonic acid. The pH of this solution was 4.5. This entire solution was added to 1520 grams of caprolactam at 90° C. Manganese chloride (0.0576 gram) and 0.1640 gram of a 50 percent aqueous solution of hypophosphorous acid were added to serve as light stabilizers. The solution was homogeneous.

This solution was poured into a 3-liter agitated glass reactor equipped with a heating mantle, and a gas inlet and outlet to provide a nitrogen blanket over the molten mixture. 80 Grams of epsilon-aminocaproic acid was added as a polymerization initiator, and 6.8 grams of sebacic acid were added as a molecular weight regulator. The mixture was then heated over a period of about 1 hour to about 255° C. When the water flashed off there was no phase separation.

At the end of 11 hours a polymer ribbon was extruded from the bottom of the reactor, which was almost colorless, without lumps and of constant cross section. Unreacted caprolactam, about 10 percent by weight, was removed by water extraction. The washed and dried polymer was submitted for analysis.

The formic acid relative viscosity was 53.5 with 68 gram equivalents of carboxyl and 22 gram equivalents of amine per $10^6$ grams of polymer. Sulfur analysis by X-ray fluorescence of the washed and dried polymer showed 2120 parts per million sulfur, or about 67 equivalents of sulfur per $10^6$ grams of polymer. A sample of the unwashed polymer contained about 2230 parts per million sulfur. The theoretical concentration of sulfur, based on the amount of polystyrenesulfonic acid salt added, was 2240 parts per million.

The polymer was submitted for spinning. It was spun using the same spinning equipment as described in Example 5. The spinnerette had 14 holes each in the shape of a "Y" to get a yarn with a "Y" cross section. The spinning temperature was about 260. Pressure drop across the sand pack in the spin pot was about 2000 psi.

The yarn was treated as in the above example, including drawing, plying to 2250 denier, knitting into sleeves, autoclaving, and dyeing. The dyed sleeve and a dyed control sleeve identical to that used in the above example were exposed to 20 parts ozone per hundred million (by volume) of air for 6, 12, and 18 hours. The Gray Scale results are as follows:

|     | 6 Hours | 12 Hours | 18 Hours |
| --- | --- | --- | --- |
| (a) Control polymer | 4 | 3 | 1.2 |
| (b) Polymer containing the lithium salt of polystyrene | 4–5 | 4 | 3 |

The above two examples show that acceptable cationically dyeable yarns can be made from polystyrenesulfonic acids of molecular weights from 500,000 to 40,000 or less. The 9 percent solution of the 500,000 molecular weight polysulfonate is as viscous as can be easily handled commercially. The 40,000 molecular weight polystyrene sulfonate is not the lower limit in molecular weight because the loss of sulfonic groups upon washing of the polymer chips to remove impurities was not significant.

EXAMPLE 20

10 Drops of Dow Corning Antifoam 35 were added to 100 cc. of distilled water. 18.2 Grams of the magnesium salt of 120,000 molecular weight polystyrenesulfonic acid, and 18.2 grams of a neutral mixture of lithium carbonate and 120,000 molecular weight polystyrenesulfonic acid were added slowly with agitation. This entire solution was added to 1520 grams of caprolactam at 90° C. Manganese chloride (0.0576 gram) and 0.1640 gram of a 50 percent aqueous solution of hypophosphorous acid were added to serve as light stabilizers. The solution was homogeneous.

This solution was poured into a 3-liter agitated glass reactor equipped with a heating mantle, and a gas inlet and outlet to provide a nitrogen blanket over the molten mixture. 80 Grams of epsilonaminocaproic acid was added as a polymerization initiator and 6.8 grams of sebacic acid was added as a molecular weight regulator. The mixture was then heated over a period of about 1 hour to about 255° C. When the water flashed off, there was no phase separation.

At the end of 6¾ hours a polymer ribbon was extruded from the bottom of the reactor which had a yellow tint, without lumps and of constant cross section. Unreacted caprolactam, about 10 percent by weight, was removed by water extraction. The washed and dried polymer was submitted for analysis.

The formic acid relative viscosity was 65, with 91 gram equivalents of carboxyl and 43 equivalents of amine per $10^6$ grams of polymer. Sulfur analysis by X-ray fluorescence of the washed and dried polymer showed 2540 parts per million sulfur, or about 80 equivalents of sulfur per $10^6$ grams of polymer. The theoretical concentration of sulfur, based on the amount of polystyrenesulfonic acid salt added, was 2540 parts per million.

The polymer was submitted for spinning. It was spun using the same spinning equipment as described in Example 2. The spinnerette had 14 holes each in the shape of a "Y" to get a yarn with a "Y" cross section. The spinning temperature was about 280° C. Pressure drop across the sand pack in the spin pot was about 2400 psi.

The undrawn yarn had a total denier of 720 or an average of 51 denier per filament. The free fall yarn had a formic acid relative viscosity of 58. Five ends of this yarn were gathered and drawn to 3.2 times the spun length, and then 2-plied to give a yarn of 2320 total denier. This yarn had a tensile strength of 2.9 grams per denier, and an ultimate elongation of 45 percent. A control yarn (pure nylon 6) spun at the same time had a tensile strength of 3.2 grams per denier and an ultimate elongation of 50 percent.

A control yarn was made from a nylon 6 polymer having a formic acid relative viscosity of 50, about 85 carboxyl equivalents per $10^6$ grams, about 23 amine equivalents with about 81 sulfonate group equivalents, from the sodium salt of sodium 5-sulfoisophthalate. It was spun on the same spinning equipment as described above, drawn, knitted into sleeves, and autoclaved at 270° as in Example 5.

The yarns were dyed in separate dye baths to to a moss green shade in a dye bath composed as in Example 5.

The dyed sleeves were then exposed for 6, 12, and 18 hours in an atmosphere of about 20 parts per hundred million of ozone, at a temperature of 104° F., at a relative humidity of 95–100 percent.

The results of ozone exposure are listed below:

|     | ΔE | | |
| --- | --- | --- | --- |
|     | 6 Hours | 12 Hours | 18 Hours |
| (a) Control, polymer with 5-sulfoisophthalate | 6.0 | 10.5 | 15.1 |
| (b) Polymer with lithium salt of polystyrene sulfonic acid | 1.1 | 2.3 | 3.8 |

EXAMPLE 21

10 Drops of Dow Corning Antifoam 35 were added to 100 cc. of distilled water. 12.95 Grams of the magnesium salt of 120,000 molecular weight polystyrenesulfonic acid, and 12.65 grams of a mixture of lithium carbonate and 120,000 molecular weight polystyrenesulfonic acid were mixed in slowly to minimize foaming. The solution has a pH of about 7.0. This entire solution was added to 1520 grams of caprolactam at 90° C. Manganese chloride (0.0576 gram) and 0.1640 gram of a 50 percent aqueous solution of hypophosphorous acid were added to serve as light stabilizers. The solution was homogeneous.

This solution was poured into a 3-liter agitated glass reactor equipped with a heating mantle and a gas inlet and outlet to provide a nitrogen blanket over the molten mixture. 80 Grams of epsilon-aminocaproic acid was added as a polymerization initiator, and 9.02 grams of 5-sulfoisophthalic acid sodium salt was added as a molecular weight regulator and dye site source. The mixture was then heated over a period of about 1 hour to about 255° C. When the water flashed off, there was no phase separation.

At the end of 12 hours a polymer ribbon was extruded from the bottom of the reactor, which was slightly yellow, without lumps and of constant cross section. Unreacted caprolactam, about 10 percent by weight, was removed by water extraction. The washed and dried polymer was submitted for analysis.

The formic acid relative viscosity was 58, with 84 gram equivalents of carboxyl and 22 gram equivalents of amine per $10^6$ grams of polymer. Sulfur analysis by X-ray fluorescence of the washed and dried polymer showed 2309 parts per million sulfur, or about 72 equivalents of sulfur per $10^6$ grams of polymer. A sample of the unwashed polymer contained about 2636 parts per million sulfur. The theoretical concentration of sulfur, based on the amount of polystyrenesulfonic acid salt added was 2540 parts per million.

The polymer was submitted for spinning. It was spun using the same spinning equipment as described in Example 2. The spinnerette had 14 holes each in the shape of a "Y" to get a yarn with a "Y" cross section. The spinning temperature was about 275° C. Pressure drop across the sand pack in the spin pot rose by about 600 psig during the half-hour spinning.

The undrawn yarn had a total denier of 717 or an average of 51 denier per filament. The free fall yarn had a formic acid relative viscosity of 46. Five ends of this yarn were gathered and drawn to 3.2 times the spun length, and then 2-plied to give a yarn of 2352 total denier. This yarn had a tensile strength of 2.5 grams per denier, and an ultimate elongation of 44 percent. A control yarn (pure nylon 6) spun at the same time had a tensile strength of 3.2 grams per denier and an ultimate elongation of 50 percent.

A control yarn was made from a nylon 6 polymer having a formic acid relative viscosity of 50, about 85 carboxyl equivalents per $10^6$ grams, about 23 amine equivalents with about 81 sulfonate group equivalents, from the sodium salt of sodium 5-sulfoisophthalate. It was spun on the same spinning equipment as described above, drawn, knitted into sleeves, and autoclaved at 270° F. as in Example 5.

The yarns were dyed in separate dye baths to a moss green shade in a dye bath composed as in Example 5.

The dyed sleeves were then exposed for 6, 12 and 18 hours in an atmosphere of about 20 parts per hundred million of ozone, at a temperature of 104° F., at a relative humidity of 95–100 percent.

The results of ozone exposure are listed below:

|  | ΔE | | |
|---|---|---|---|
|  | 6 Hours | 12 Hours | 18 Hours |
| (a) Control, polymer with 5-sulfoisophthalate | 6.0 | 10.5 | 15.1 |
| (b) Polymer with lithium salt of polystyrene sulfonic acid | 1.0 | 2.8 | 3.1 |

This example shows that a mixture of soluble salts of polystyrenesulfonic acid can be used with a molecular weight regulator which bears a sulfonate.

EXAMPLE 22

53.05 Grams of a 34.8 percent aqueous solution of a 70,000 molecular weight polystyrene sulfonic acid is added to 1520 grams of caprolactam at 90° C. Manganese chloride (0.0576 gram) and 0.1640 gram of a 50 percent aqueous solution of hypophosphorous acid are added to serve as light stabilizers. The solution is homogeneous.

This solution is poured into a 3-liter agitated glass reactor equipped with a heating mantle, and a gas inlet and outlet to provide a nitrogen blanket over the molten mixture. 80 Grams of epsilonaminocaproic acid is added as a polymerization initiator. 4.095 Grams of lithium hydroxide monohydrate are added to neutralize the polystyrene sulfonic acid, and 6.8 grams of sebacic acid is added as a nylon molecular weight regulator. The mixture is then heated over a period of about 1 hour to about 255° C. When the water flashes off there is no phase separation.

At the end of about 8 hours, a polymer ribbon is extruded from the bottom of the reactor. Unreacted caprolactam, about 10 percent by weight, is removed by water extraction.

The formic acid relative viscosity is about 55 with about 75 gram equivalents of carboxyl and 25 gram equivalents of amine per $10^6$ grams of polymer. The theoretical concentration of sulfur, based on the amount of polystyrenesulfonic acid salt added, was 2240 parts per million.

EXAMPLE 23

The following solutions were prepared by adding various amounts of lithium hydroxide monohydrate to 53.05 grams of an aqueous solution of polystyrenesulfonic acid. After the lithium hydroxide dissolved, the pH of the solution was measured with a Fisher Accumet ® Model 230 pH/ion meter.

| | | | % of Neutralization* |
|---|---|---|---|
| Solution A | 4.0758 g. LiOH . H₂O | pH = 4.0 | 99.8 |
| Solution B | 4.0840 g. LiOH . H₂O | pH = 7.0 | 100 |
| Solution C | 4.0960 g. LiOH . H₂O | pH = 9.5 | 100.3 |
| Solution D | 4.0347 g. LiOH . H₂O | pH = 2.2 | 98.8 |

*% of Neutralization = $\frac{\text{Amount Added in Grams}}{4.084} \times 100$

These solutions were poured into four different lots of 1520 grams of caprolactam at 90° C. Manganese chloride (0.0576 gram) and a 50 percent aqueous solution of hypophosphorous acid (0.1640 gram) were added. These solutions were each poured into 3-liter agitated glass reactor equipped with heating mantles, and provided with an inert gas sweep. 80 Grams of epsilon-aminocaproic acid and 6.8 grams of sebacic acid was added to each reactor and the mixtures stirred for about 12 hours at 250° C. At the end of this time a tough strand product was extruded from the bottom of the reactor, cooled in a water trough, and pelletized. The polymer color in all cases was a light yellow, irrespective of pH. The degree of polymerization was not lowered by the presence of either high or low pH sulfonates, based on the amps required to drive the reactor agitator at the end of polymerization.

This shows that, in glass reactors at least, a wide range of pH's of the lithium salt of polystyrenesulfonic acid can be used to make an acceptable nylon polymer.

DISCUSSION

Example 18 shows that a salt having a molecular weight as high as 500,000 is still feasible, and Example 19 shows that a 40,000 molecular weight salt is still not the lower limit of molecular weight for the workable salts of this invention.

It can be seen from Examples 20 and 21 that mixtures of the lithium, magnesium and calcium salts of sulfonate polystyrene can also be used for this invention.

Example 22 proposes that the cations of this invention can be added to polystyrene sulfonic acid to form the salt in the reactor rather than in the aqueous solution prior to addition to the reactor.

Example 23 shows that, since the polystyrene sulfonic acid is a strong acid and the Li (and Mg and Ca) salt is a strong base, the pH of the aqueous solution swings widely with only small amounts of excess acid or base. This small amount of acid or base is so thoroughly diluted by the overwhelming amount of polymer precursor (lactam, etc.) that the pH of the aqueous solution of the sulfonated polystyrene salt of this invention has very little effect on the pH during polymerization. Thus, the wide operable range of pH of the salt to be added is possible, and explained. Since both Li, Mg, and Ca salt and the sulfonic acid, as commercially available, probably have minor amounts of other cations present as impurities, the remainder of the aqueous salt solution, i.e., that not neutralized as Li, Mg or Ca salt, will be either the sulfonic acid or a salt having a cation from Group I or II of the Periodic Table (as reported by the Committee of the International Union of Chemistry, hereinafter, C.I.U. of C.).

It can be seen that if over 98 percent of the sulfonated polystyrene salt is the Li, Mg or Ca salt thereof, with the remainder being the sulfonic acid or a cationic from Group I or II, the invention should be operable. Preferably, the sulfonated polystyrene salt is neutralized to between about 98.8 and 100.3 percent at neutralization, corresponding to a pH of between about 2.2 and about 9.5.

We claim:

1. In a method to make a fiber-forming synthetic linear polyamide having a repeating structure of

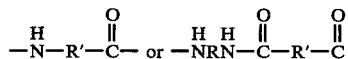

where R and R' are radicals of 3 to 13 carbon atoms, receptive to cationic dyes by the addition of a sulfonated polystyrene or salt thereof, said polyamide having from about 10 to about 60 amine gram equivalents per $10^6$ grams of polymer and a ratio of less than ten sulfonate gram equivalents per amine gram equivalents, the improvement comprising
adding to said polyamide a water soluble salt selected from the group consisting of the lithium, magnesium and calcium salts of a sulfonated polystyrene homopolymer, said salt being sulfonated to over 90 percent of the theoretical maximum of complete monosulfonation of each styrene residue moiety, said salt having a molecular weight from between about 15,000 to about 300,000 and having a pH of between about 3 and about 8, said polyamide containing said salt having a concentration of sulfonates of from between about 40 and about 180 gram equivalents per $10^6$ grams of polymer, and shaping said polyamide into a shaped article,
whereby said dyed polyamide article has highly improved resistance to fading of the cationic dye due to exposure to ozone.

2. The method of claim 1 wherein said salts are added to precursors of said polyamide and said polyamide containing said salts is polymerized.

3. The method of claim 1 wherein said shaping is spinning of said polyamide into a fiber.

4. The method of claim 1 wherein said salts are added as an aqueous solution.

5. The method of claim 1 wherein said salt is lithium salt.

6. The method of claim 1 wherein said salt has a molecular weight of from between about 30,000 to about 300,000.

7. The method of claim 2 where said shaping is spinning to a fiber.

8. The method of claim 7 wherein said salt is added as an aqueous solution and the molecular weight of said salt is from about 30,000 to about 300,000.

9. The method of claim 1 wherein said salt is added highly concentrated in a master batch of said polyamide.

10. The method of claim 2 wherein a polymer molecular weight regulator is also added in an amount of from about 25 to about 90 gram equivalents per $10^6$ grams polymer.

11. The method of claim 10 wherein the polymer molecular weight regulator is 5-sulfoisophthalic acid, or the alkaline metal salt thereof.

12. The method of claim 10 wherein said molecular weight regulator is a carboxylic acid or ester bearing an aromatic sulfonic or polysulfonic acid or alkaline metal salt thereof.

13. The method of claim 12 wherein said molecular weight regulator is a compound of the structure:

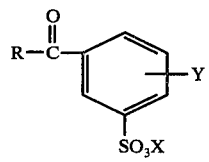

wherein X is Li, Na, K or $NH_4$, Y is H or

R is OH, Cl, $OCH_3$ or $OC_2H_5$ and the carboxyl groups are not ortho to one another.

14. The method of claim 10 wherein said salt has a concentration of from between about 20 to about 100 equivalents per $10^6$ grams of polymer.

15. The method of claim 11 wherein said salt has a concentration of from between about 20 to about 100 equivalents per $10^6$ grams of polymer.

16. The method of claim 12 wherein said salt has a concentration of from between about 20 to about 100 equivalents per $10^6$ grams of polymer.

17. The method of claim 13 wherein said salt has a concentration of from between about 20 to about 100 equivalents per $10^6$ grams of polymer.

18. The method of claim 11 wherein said salt has a concentration of from between about 40 to about 80 equivalents per $10^6$ grams of polymer.

19. The method of claim 12 wherein said salt has a concentration of from between about 40 to about 80 equivalents per $10^6$ grams of polymer.

20. The method of claim 13 wherein said salt has a concentration of from between about 40 to about 80 equivalents per $10^6$ grams of polymer.

21. In a method to make a fiber-forming synthetic linear polyamide having a repeating structure of

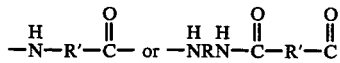

where R and R' are radicals of 3 to 13 carbon atoms, receptive to cationic dyes by the addition of a sulfonated polystyrene or salt thereof, said polyamide having from about 10 to about 60 amine gram equivalents per $10^6$ grams of polymer and a ratio of less than ten sulfonate gram equivalents per amine gram equivalents, the improvement comprising adding to said polyamide a water soluble salt selected from the group consisting of the lithium, magnesium, calcium salts and mixtures thereof of a sulfonated polystyrene homopolymer, said salt being sulfonated to over 90 percent of the theoretical maximum of complete monosulfonation of each styrene residue moiety, said salt having a molecular weight from between about 15,000 to about 500,000 and over 98 percent of said sulfonated polystyrene salt being present as said salt with the remainder being only sulfonic acid or a salt having a cation from Group I or II of the Periodic Table (C.I.U. of C.), said polyamide containing said salt having a concentration of sulfonates of from between about 40 and about 180 gram equivalents per $10^6$ grams of polymer, and shaping said polyamide into a shaped article, whereby said dyed polyamide article has highly improved resistance to fading of the cationic dye due to exposure to ozone.

22. The method of claim 21 wherein said salt is added as an aqueous solution, the molecular weight of said salt is from about 40,000 to about 500,000, and said shaping is spinning to a fiber.

23. The method of claim 21 wherein the molecular weight of said salt is from about 30,000 to about 300,000.

24. The method of claim 21 wherein said sulfonated polystyrene salt is neutralized to between about 98.8 and about 100.3 percent of neutralization.

25. In a method to make a fiber-forming synthetic linear polyamide having a repeating structure of

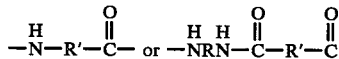

where R and R' are radicals of 3 to 13 carbon atoms, receptive to cationic dyes by the addion of a sulfonated polystyrene or salt thereof, said polyamide having from about 10 to about 60 amine gram equivalents per $10^6$ grams of polymer and a ratio of less than ten sulfonate gram equivalents per amine gram equivalents, the improvement comprising adding to said polyamide a water soluble salt selected from the group consisting of the lithium, magnesium, calcium salts and mixtures thereof, of a sulfonated polystyrene homopolymer, said salt being sulfonated to over 90 percent of the theoretical maximum of complete monosulfonation of each styrene residue moiety, said salt having a molecular weight from between about 15,000 to about 300,000 and having a pH of between about 2.2 and about 9.5, with any remaining unneutralized salt having a cation from Group I or II of the Periodic Table (C.I.U. of C.), said polyamide containing said salt having a concentration of sulfonates of from between about 40 and about 180 gram equivalents per $10^6$ grams of polymer, and shaping said polyamide into a shaped article, whereby said dyed polyamide article has highly improved resistance to fading of the cationic dye due to exposure to ozone.

26. The method of claim 25 wherein said salt is added as an aqueous solution, the molecular weight of said salt is from about 30,000 to about 300,000, and said shaping is spinning to a fiber.

27. The method of claim 25 wherein a polymer molecular weight regulator is also added in an amount of from about 25 to about 90 gram equivalents per $10^6$ grams polymer.

28. The method of claim 27 wherein the polymer molecular weight regulator is 5-sulfoisophthalic acid, or the alkaline metal salt thereof.

29. The method of claim 28 wherein said molecular weight regulator is a carboxylic acid or ester bearing an aromatic sulfonic or polysulfonic acid or alkaline metal salt thereof.

30. The method of claim 29 wherein said molecular weight regulator is a compound of the structure:

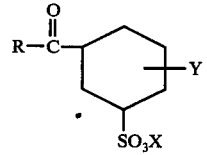

wherein X is Li, Na, K or $NH_4$, Y is H or

R is OH, Cl, $OCH_3$ or $OC_2H_5$ and the carboxyl groups are not ortho to one another.

* * * * *